US012166272B2

(12) United States Patent
Yang

(10) Patent No.: US 12,166,272 B2
(45) Date of Patent: Dec. 10, 2024

(54) ELECTRONIC DEVICE COMPRISING ANTENNA AND SEGMENTATION PART

(71) Applicant: Samsung Electronics Co., Ltd., Suwon-si (KR)

(72) Inventor: Junyoung Yang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 148 days.

(21) Appl. No.: 18/152,497

(22) Filed: Jan. 10, 2023

(65) Prior Publication Data

US 2023/0163447 A1 May 25, 2023

Related U.S. Application Data

(63) Continuation of application No. PCT/KR2021/008951, filed on Jul. 13, 2021.

(30) Foreign Application Priority Data

Aug. 3, 2020 (KR) ........................ 10-2020-0096702

(51) Int. Cl.
*H01Q 1/24* (2006.01)
*H01Q 1/48* (2006.01)
*H01Q 9/04* (2006.01)

(52) U.S. Cl.
CPC ............... *H01Q 1/243* (2013.01); *H01Q 1/48* (2013.01); *H01Q 9/0407* (2013.01)

(58) Field of Classification Search
None
See application file for complete search history.

(56) References Cited

U.S. PATENT DOCUMENTS 9,065,175 B2 6/2015 Corbin et al.
10,439,268 B2 10/2019 Son et al.
(Continued)

FOREIGN PATENT DOCUMENTS

EP 3 435 637 A1 1/2019
EP 3 506 423 A1 7/2019
(Continued)

OTHER PUBLICATIONS

Indian Office Action dated Oct. 28, 2023, issued in Indian Application No. 202317002204.
(Continued)

*Primary Examiner* — Wilson Lee
(74) *Attorney, Agent, or Firm* — Jefferson IP Law, LLP

(57) ABSTRACT

An electronic device comprising an antenna and a segmentation part is provided. The electronic device includes a conductive housing, a printed circuit board arranged in the internal space of the conductive housing and comprising a wireless communication module, a conductive plate on which the printed circuit board is arranged, a segmentation part for segmenting at least a portion of the conductive housing, an opening arranged between the conductive housing and the conductive plate, an antenna formed via the segmentation part and the opening, and a non-conductive member for filling at least a portion of the segmentation part and the opening. The distance between a mutually facing end surface of the antenna and end surface of the conductive plate is configured to vary.

20 Claims, 14 Drawing Sheets

(56) References Cited

U.S. PATENT DOCUMENTS

| | | | | |
|---|---|---|---|---|
| 10,446,916 | B2 | 10/2019 | Kim et al. | |
| 10,511,079 | B2 | 12/2019 | Wu et al. | |
| 11,411,300 | B2 | 8/2022 | Lee et al. | |
| 2016/0044801 | A1 | 2/2016 | Lee et al. | |
| 2016/0050302 | A1 | 2/2016 | Lee et al. | |
| 2017/0033441 | A1 | 2/2017 | Son et al. | |
| 2017/0033812 | A1 | 2/2017 | Son et al. | |
| 2017/0244818 | A1 | 8/2017 | Kim et al. | |
| 2017/0347470 | A1 | 11/2017 | Seo et al. | |
| 2018/0288203 | A1 | 10/2018 | Jeon et al. | |
| 2019/0081396 | A1 | 3/2019 | Zhou et al. | |
| 2019/0081404 | A1 | 3/2019 | Jeon et al. | |
| 2019/0191597 | A1* | 6/2019 | Han | H01Q 3/08 |
| 2019/0207300 | A1 | 7/2019 | Wu et al. | |
| 2019/0384358 | A1 | 12/2019 | Choe et al. | |
| 2020/0136243 | A1 | 4/2020 | Shin et al. | |
| 2020/0245481 | A1 | 7/2020 | Yoon et al. | |
| 2020/0373675 | A1* | 11/2020 | Ahmed | H01Q 1/38 |
| 2021/0057827 | A1* | 2/2021 | Kim | H01Q 21/0087 |
| 2021/0408682 | A1* | 12/2021 | Khripkov | H01Q 3/46 |
| 2022/0052437 | A1 | 2/2022 | Lee et al. | |
| 2022/0381895 | A1* | 12/2022 | Hur | H01Q 3/34 |
| 2023/0187839 | A1* | 6/2023 | Suh | H01Q 5/357<br>343/700 R |
| 2023/0344132 | A1* | 10/2023 | Wang | H01Q 9/0421 |

FOREIGN PATENT DOCUMENTS

| | | | |
|---|---|---|---|
| KR | 10-2016-0019248 | A | 2/2016 |
| KR | 10-2016-0019833 | A | 2/2016 |
| KR | 10-2017-0013677 | A | 2/2017 |
| KR | 10-2017-0133977 | A | 12/2017 |
| KR | 10-2018-0074395 | A | 7/2018 |
| KR | 10-2019-0086160 | A | 7/2019 |
| KR | 10-2020-0026000 | A | 3/2020 |
| KR | 10-2020-0036460 | A | 4/2020 |

OTHER PUBLICATIONS

European Search Report dated Dec. 4, 2023, issued in European Application No. 21854399.9.

Korean Office Action dated May 24, 2024, issued in Korean Application No. 10-2020-0096702.

Indian Notice of Hearing dated Jun. 10, 2024, issued in Indian Application No. 202317002204.

* cited by examiner

ELECTRONIC DEVICE COMPRISING ANTENNA AND SEGMENTATION PART

CROSS-REFERENCE TO RELATED APPLICATION(S)

This application is a continuation application, claiming priority under § 365(c), of an International application No. PCT/KR2021/008951, filed on Jul. 13, 2021, which is based on and claims the benefit of a Korean patent application number 10-2020-0096702, filed on Aug. 3, 2020, in the Korean Intellectual Property Office, the disclosure of each of which is incorporated by reference herein in its entirety.

BACKGROUND

1. Field

The disclosure relates to an electronic device including an antenna and a segment part.

2. Description of Related Art

The use of portable electronic devices such as smart phones is increasing, and various functions are provided to the electronic devices.

The electronic device may transmit and receive a phone call and various data to and from another electronic device through wireless communication.

The electronic device may include at least one antenna so as to perform wireless communication with another electronic device.

The above information is presented as background information only to assist with an understanding of the disclosure. No determination has been made, and no assertion is made, as to whether any of the above might be applicable as prior art with regard to the disclosure.

SUMMARY

In an electronic device such as a smart phone, at least a portion of a housing forming an external shape may include a conductive material (e.g., metal).

At least a portion of the housing including the conductive material may be used as an antenna radiator for performing wireless communication. For example, the housing may be separated through at least one segment part (e.g., slit) to be used as a plurality of antennas.

At least a portion of a housing (e.g., lateral member) used as the antenna should be spaced apart from a conductive plate (e.g., bracket or support member) inside the electronic device at a predetermined distance to secure a performance of the antenna.

End surfaces between at least a portion of the housing and the conductive plate may be formed in a symmetrical structure, and as a distance between the end surfaces reduces, a radiation loss may increase.

In order to secure an antenna performance of the electronic device, in the case that a plurality of segment parts are formed in the housing, the electronic device may be vulnerable to an external impact.

Aspects of the disclosure are to address at least the above-mentioned problems and/or disadvantages and to provide at least the advantages described below. Accordingly, an aspect of the disclosure is to provide an electronic device that maintains a radiation performance of an antenna and maintains rigidity of a housing.

Additional aspects will be set forth in part in the description which follows and, in part, will be apparent from the description, or may be learned by practice of the presented embodiments.

In accordance with an aspect of the disclosure, an electronic is provided. The electronic device includes a conductive housing, a printed circuit board disposed in an inner space of the conductive housing and including a wireless communication module, a conductive plate in which the printed circuit board is disposed, a segment part configured to separate at least a portion of the conductive housing, an opening disposed between the conductive housing and the conductive plate, an antenna formed through the segment part and the opening, and a non-conductive member configured to fill at least a portion of the segment part and the opening, wherein a distance between facing surfaces of an end surface of the antenna and an end surface of the conductive plate may be configured to be not constant.

In accordance with another aspect of the disclosure, an electronic is provided. The electronic device includes a conductive housing, a segment part configured to separate at least a portion of the conductive housing, an opening disposed between the conductive housing and a conductive plate, an antenna formed through the segment part and the opening, a non-conductive member configured to fill at least a portion of the segment part and the opening, a display disposed at a first surface of the conductive plate, a printed circuit board disposed at a second surface of the conductive plate and including a wireless communication module, and a rear plate configured to cover a rear surface of the printed circuit board, wherein a distance between facing surfaces of an end surface of the antenna and an end surface of the conductive plate may be configured to be not constant.

According to various embodiments of the disclosure, by forming a distance between facing surfaces of an antenna and a conductive plate (e.g., bracket or support member) disposed adjacent to a segment part formed in a side portion of a housing not to be constant, and reducing an area in which the antenna and the conductive plate face, it is possible to provide an electronic device that maintains rigidity of the housing while maintaining a radiation performance of the antenna.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms “a,” “an,” and “the” include plural referents unless the context clearly dictates otherwise. Thus, for example, reference to “a component surface” includes reference to one or more of such surfaces.

Figure 1:
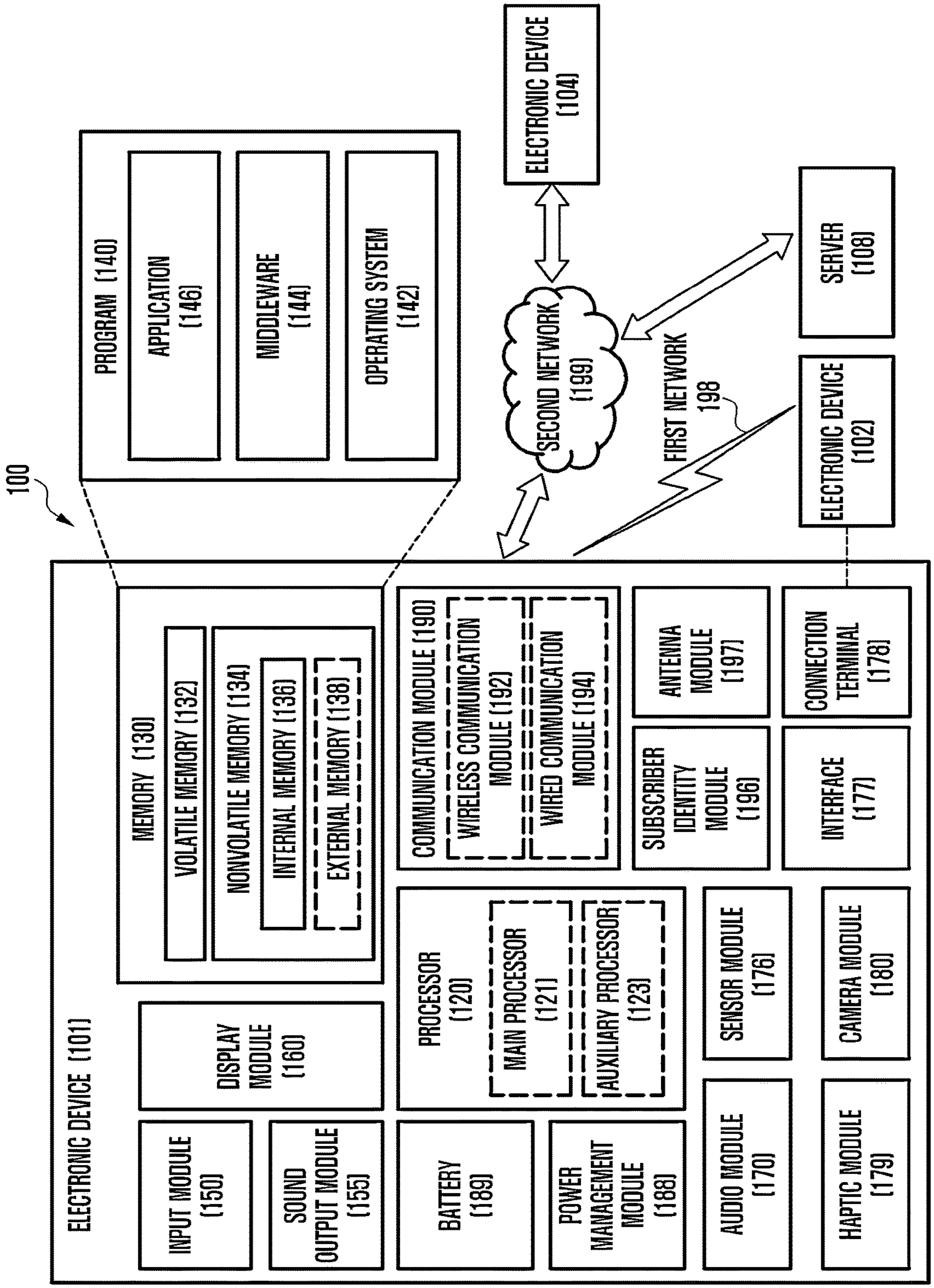
FIG. 1 is a block diagram illustrating an electronic device in a network environment according to an embodiment of the disclosure.

FIG. 1 is a block diagram illustrating an electronic device in a network environment according to an embodiment of the disclosure.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134. The non-volatile memory 134 may include internal memory 136 and/or external memory 138.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, Wi-Fi direct, or infrared data association (IrDA)) or the second network 199 (e.g., a long-range communication network, such as a legacy cellular network, a fifth generation (5G) network, a next-generation communication network, the Internet, or a computer network (e.g., LAN or wide area network (WAN))). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
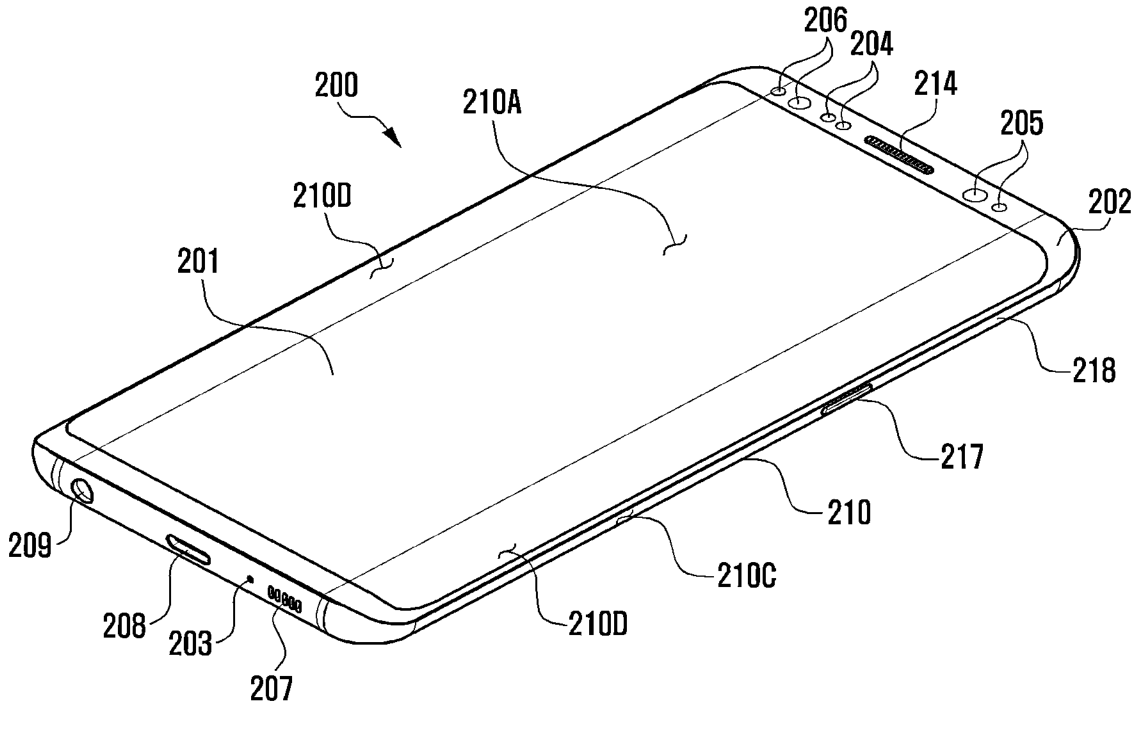
FIG. 2A is a perspective view illustrating a front surface of an electronic device according to an embodiment of the disclosure.

FIG. 2A is a perspective view illustrating a front surface of an electronic device according to an embodiment of the disclosure.

Figure 2B:
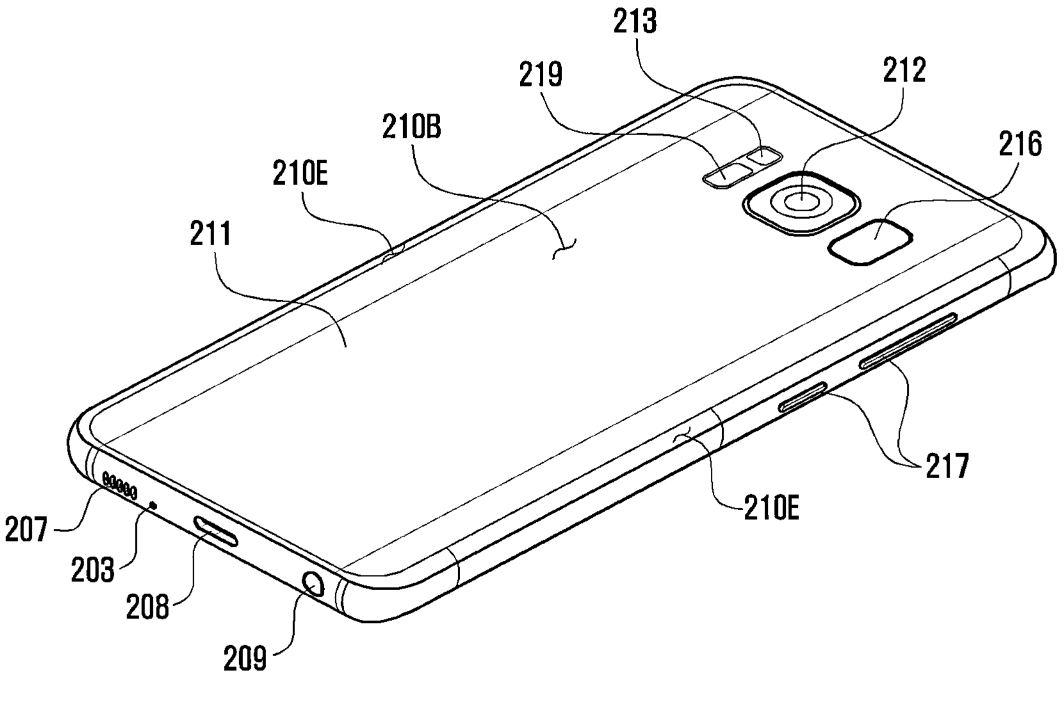
FIG. 2B is a perspective view illustrating a rear surface of the electronic device of FIG. 2A according to an embodiment of the disclosure.

FIG. 2B is a perspective view illustrating a rear surface of the electronic device of FIG. 2A according to an embodiment of the disclosure.

Referring to FIGS. 2A and 2B, an electronic device 200 according to an embodiment may include a housing 210 including a first surface (or front surface) 210A, a second surface (or rear surface) 210B, and a side surface 210C surrounding the space between the first surface 210A and the second surface 210B. In another embodiment (not illustrated), the housing may denote a structure that forms a part of the first surface 210A, the second surface 210B, and the side surface 210C illustrated in FIGS. 2A and 2B. According to an embodiment, the first surface 210A may be formed by a front plate 202, at least a part of which is substantially transparent (for example, a glass plate including various coating layers, or a polymer plate). The second surface 210B may be formed by a rear plate 211 that is substantially opaque. The rear plate 211 may be made of coated or colored glass, ceramic, polymer, metal (for example, aluminum, stainless steel (STS), or magnesium), or a combination of at least two of the above-mentioned materials. The side surface 210C may be formed by a side bezel structure (or "side member") 218 which is coupled to the front plate 202 and to the rear plate 211, and which includes metal and/or polymer. In some embodiments, the rear plate 211 and the side bezel structure 218 may be formed integrally and may include the same material (for example, a metal material such as aluminum).

In the illustrated embodiment, the front plate 202 may include two first areas 210D on both ends of the long edge of the front plate 202 such that the two first areas 210D bend from the first surface 210A toward the rear plate 211 and extend seamlessly. In the illustrated embodiment (see FIG. 2B), the rear plate 211 may include two second areas 210E on both ends of the long edge such that the two second areas 210E bend from the second surface 210B toward the front plate 202 and extend seamlessly. In some embodiments, the front plate 202 (or the rear plate 211) may include only one of the first areas 210D (or the second areas 210E). In another embodiment, a part of the first areas 210D or the second areas 210E may not be included. In the above embodiments, when seen from the side surface of the electronic device 200, the side bezel structure 218 may have a first thickness (or width) on a part of the side surface, which does not include the first areas 210D or the second areas 210E as described above, and may have a second thickness that is smaller than the first thickness on a part of the side surface, which includes the first areas 210D or the second areas 210E.

According to an embodiment, the electronic device 200 may include at least one of a display 201, audio modules 203, 207, and 214, sensor modules 204, 216, and 219, camera modules 205, 212, and 213, a key input device 217, a light-emitting element 206, and connector holes 208 and 209. In some embodiments, at least one of the constituent elements (for example, the key input device 217 or the light-emitting element 206) of the electronic device 200 may be omitted, or the electronic device 200 may additionally include another constituent element.

The display 201 may be exposed through a corresponding part of the front plate 202, for example. In some embodiments, at least a part of the display 201 may be exposed through the front plate 202 that forms the first areas 210D of the side surface 210C and the first surface 210A. In some embodiments, the display 201 may have a corner formed in substantially the same shape as that of the adjacent outer periphery of the front plate 202. In another embodiment (not illustrated), in order to increase the area of exposure of the display 201, the interval between the outer periphery of the display 201 and the outer periphery of the front plate 202 may be formed to be substantially identical.

In another embodiment (not illustrated), a recess or an opening may be formed in a part of the screen display area of the display 201, and at least one of an audio module 214, a sensor module 204, a camera module 205, and a light-emitting element 206 may be included and aligned with the recess or the opening. In another embodiment (not illustrated), on the back surface of the screen display area of the display 201, at least one of an audio module 214, a sensor module 204, a camera module 205, a fingerprint sensor 216, and a light-emitting element 206 may be included. In another embodiment (not illustrated), the display 201 may be coupled to or arranged adjacent to a touch sensing circuit, a pressure sensor capable of measuring the intensity (pressure) of a touch, and/or a digitizer that detects a magnetic field-type stylus pen. In some embodiments, at least a part of the sensor modules 204 and 219 and/or at least a part of the key input device 217 may be arranged in the first areas 210D and/or the second areas 210E.

The audio modules 203, 207, and 214 may include a microphone hole 203 and speaker holes 207 and 214. A microphone for acquiring an external sound may be arranged in the microphone hole 203, and a plurality of microphones may be arranged therein such that the direction of a sound can be sensed in some embodiments. The speaker holes 207 and 214 may include an outer speaker hole 207 and a speech receiver hole 214. In some embodiments, the speaker holes 207 and 214 and the microphone hole 203 may be implemented as a single hole, or a speaker may be included (for example, a piezoelectric speaker) without the speaker holes 207 and 214.

The sensor modules 204, 216, and 219 may generate an electric signal or a data value corresponding to the internal operating condition of the electronic device 200 or the external environment condition thereof. The sensor modules 204, 216, and 219 may include, for example, a first sensor module 204 (for example, a proximity sensor) arranged on the first surface 210A of the housing 210, and/or a second sensor module (not illustrated) (for example, a fingerprint sensor), and/or a third sensor module 219 (for example, an HRM sensor) arranged on the second surface 210B of the housing 210, and/or a fourth sensor module 216 (for example, a fingerprint sensor). The fingerprint sensor may be arranged not only on the first surface 210A (for example, the display 201) of the housing 210, but also on the second surface 210B thereof. The electronic device 200 may further include a sensor module not illustrated, for example, at least one of a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, or a luminance sensor 204.

The camera modules 205, 212, and 213 may include a first camera device 205 arranged on the first surface 210A of the electronic device 200, a second camera device 212 arranged on the second surface 210B thereof, and/or a flash 213. The camera devices 205 and 212 may include a single lens or a plurality of lenses, an image sensor, and/or an image signal processor. The flash 213 may include, for example, a light-emitting diode or a xenon lamp. In some embodiments, two or more lenses (an infrared camera, a wide-angle lens, and a telephoto lens) and image sensors may be arranged on a single surface of the electronic device 200.

The key input device 217 may be arranged on the side surface 210C of the housing 210. In another embodiment, the electronic device 200 may not include a part of the above-mentioned key input device 217 or the entire key input device 217, and the key input device 217 (not included) may be implemented in another type, such as a soft key, on the display 201. In some embodiments, the key input device may include a sensor module 216 arranged on the second surface 210B of the housing 210.

The light-emitting element 206 may be arranged on the first surface 210A of the housing 210, for example. The light-emitting element 206 may provide information regarding the condition of the electronic device 200 in a light type, for example. In another embodiment, the light-emitting element 206 may provide a light source that interworks with operation of the camera module 205, for example. The light-emitting element 206 may include, for example, an LED, an IR LED, and a xenon lamp.

The connector holes 208 and 209 may include a first connector hole 208 capable of containing a connector (for example, a USB connector) for transmitting/receiving power and/or data to/from an external electronic device, and/or a second connector hole (for example, an earphone jack) 209 capable of containing a connector for transmitting/receiving an audio signal to/from the external electronic device.

Figure 3:
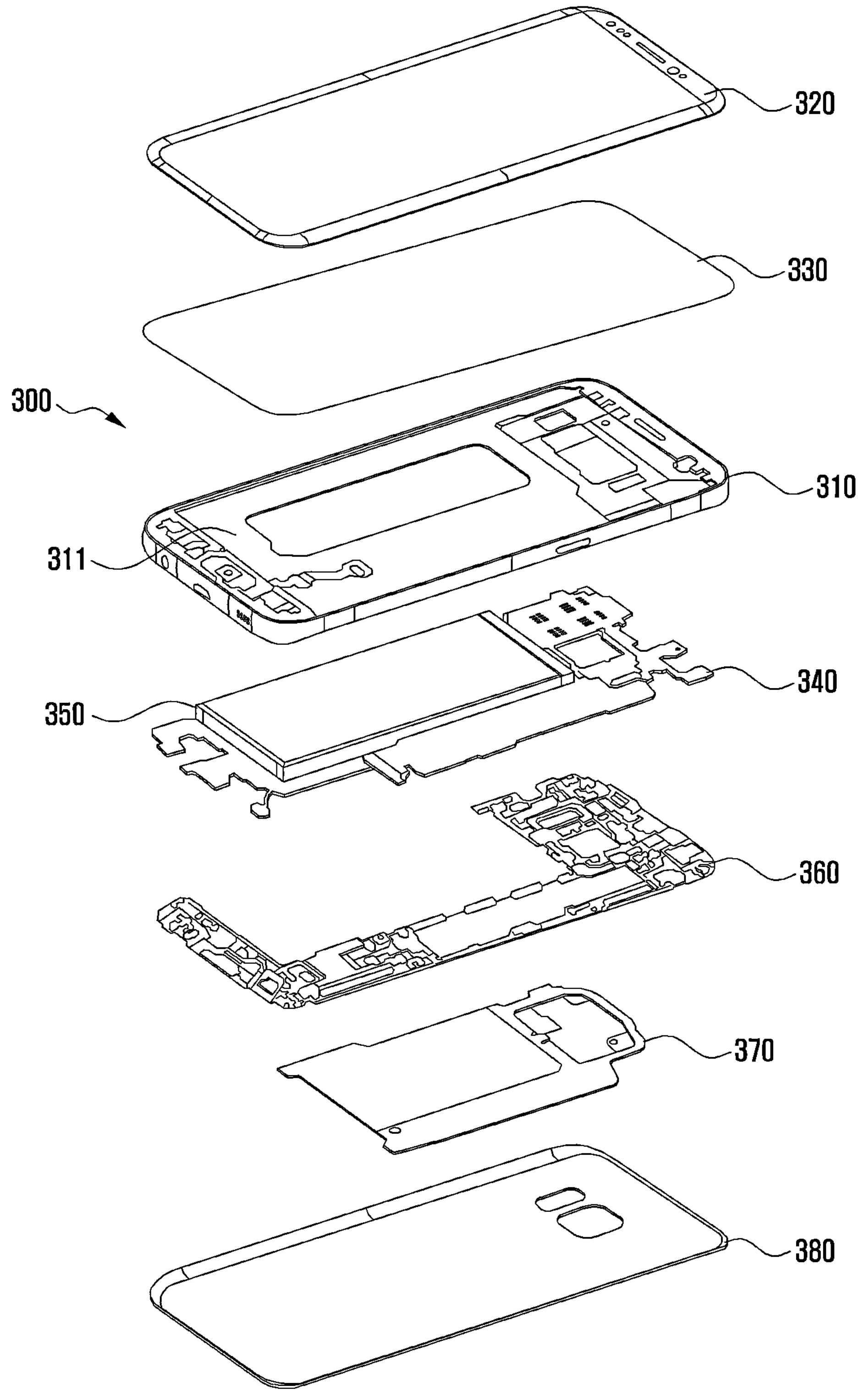
FIG. 3 is an exploded perspective view illustrating an electronic device according to an embodiment of the disclosure.

FIG. 3 is an exploded perspective view illustrating an electronic device according to an embodiment of the disclosure.

Referring to FIG. 3, the electronic device 300 may include a side bezel structure 310, a first support member 311 (for example, a bracket), a front plate 320, a display 330, a printed circuit board 340, a battery 350, a second support member 360 (for example, a rear case), an antenna 370, and a rear plate 380. In some embodiments, at least one of the constituent elements (for example, the first support member 311 or the second support member 360) of the electronic device 300 may be omitted, or the electronic device 300 may further include another constituent element. At least one of the constituent elements of the electronic device 300 may be identical or similar to at least one of the constituent elements of the electronic device 101 or 200 of FIGS. 1, 2A, and 2B, and repeated descriptions thereof will be omitted herein.

The first support member 311 may be arranged inside the electronic device 300 and connected to the side bezel structure 310, or may be formed integrally with the side bezel structure 310. The first support member 311 may be made of a metal material and/or a nonmetal (for example, polymer) material, for example. The display 330 may be coupled to one surface of the first support member 311, and the printed circuit board 340 may be coupled to the other surface thereof. A processor, a memory, and/or an interface may be mounted on the printed circuit board 340. The processor may include, for example, one or more of a central processing device, an application processor, a graphic processing device, an image signal processor, a sensor hub processor, or a communication processor.

The memory may include a volatile memory or a non-volatile memory, for example.

The interface may include, for example, a high definition multimedia interface (HDMI), a universal serial bus (USB) interface, an SD card interface, and/or an audio interface. The interface may connect the electronic device 300 with an external electronic device electrically or physically, for example, and may include a USB connector, an SD card/MMC connector, or an audio connector.

The battery 350 is a device for supplying power to at least one constituent element of the electronic device 300, and may include a non-rechargeable primary cell, a rechargeable secondary cell, or a fuel cell, for example. At least a part of the battery 350 may be arranged on substantially the same plane with the printed circuit board 340, for example. The battery 350 may be arranged integrally inside the electronic device 300, or may be arranged such that the same can be attached to/detached from the electronic device 300.

The antenna 370 may be arranged between the rear plate 380 and the battery 350. The antenna 370 may include, for example, a near field communication (NFC) antenna, a wireless charging antenna, and/or a magnetic secure transmission (MST) antenna. The antenna 370 may conduct near-field communication with an external device or may wirelessly transmit/receive power necessary for charging, for example. In another embodiment, an antenna structure may be formed by a part or a combination of the side bezel structure 310 and/or the first support member 311.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively," as "coupled with," coupled "to, connected with"", "or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an embodiment, the module may be implemented in a form of an application-specific integrated circuit (ASIC).

Figure 4:
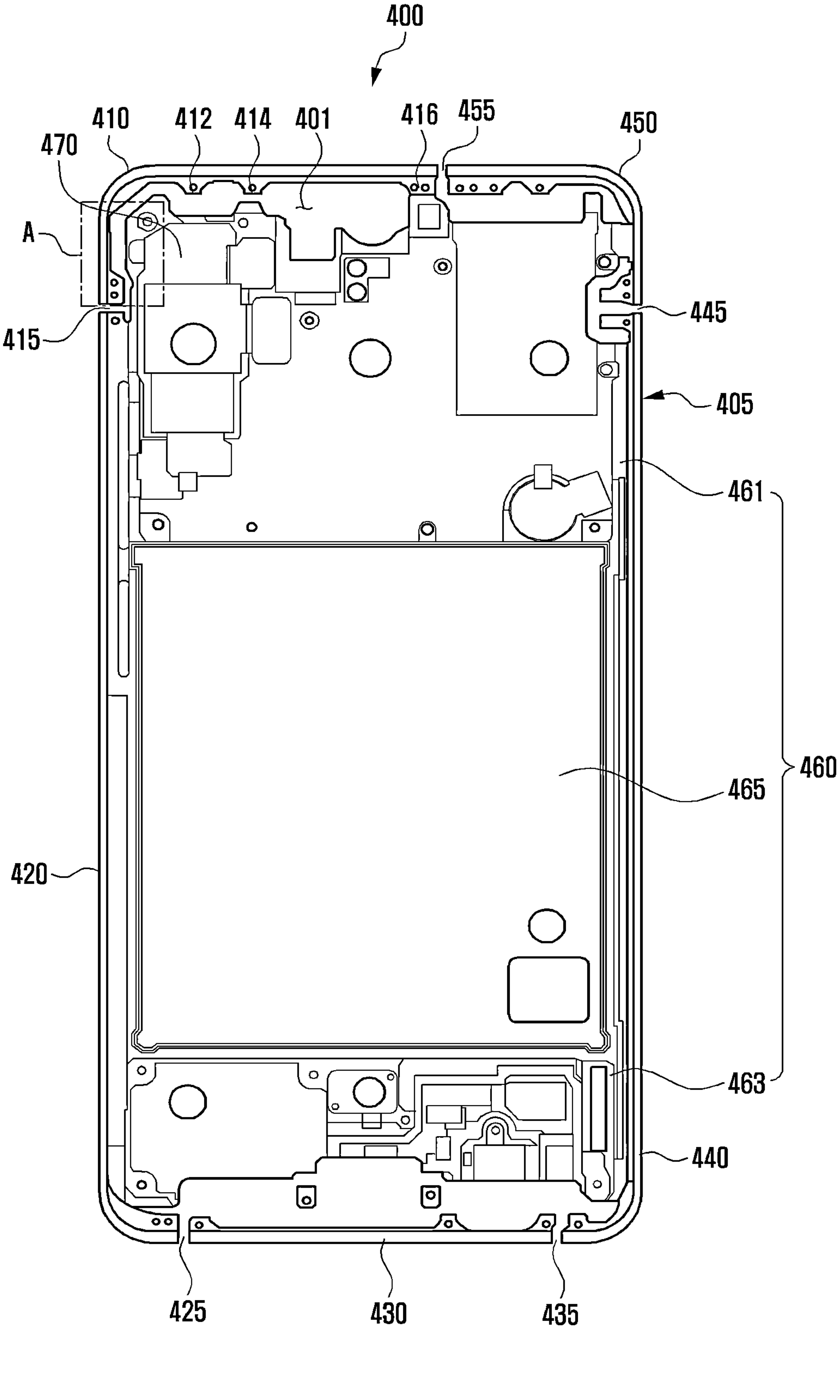
FIG. 4 is a diagram schematically illustrating a partial constitution of an electronic device including an antenna and a segment part according to an embodiment of the disclosure.

FIG. 4 is a diagram schematically illustrating a partial constitution of an electronic device including an antenna and a segment part according to an embodiment of the disclosure.

Figure 5:
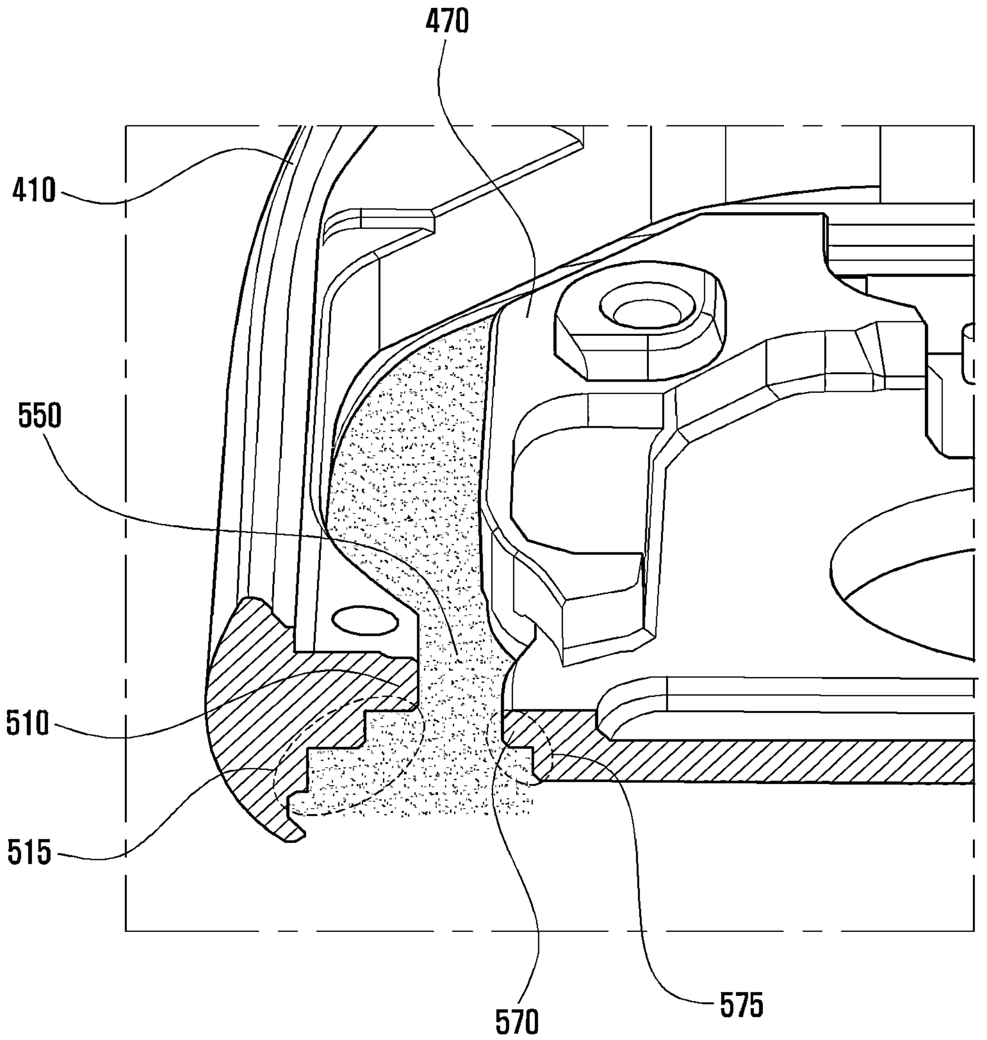
FIG. 5 is an enlarged view schematically illustrating a portion of a part A of FIG. 4 according to an embodiment of the disclosure.

FIG. 5 is an enlarged view illustrating a portion of a part A of FIG. 4 according to an embodiment of the disclosure.

An electronic device 400 of FIG. 4 may include components described through the electronic device 101 of FIG. 1, the electronic device 200 of FIGS. 2A and 2B, and/or the electronic device 300 of FIG. 3.

Referring to FIG. 4, the electronic device 400 according to various embodiments of the disclosure may include a front plate (e.g., the front plate 202 of FIG. 2A or the front plate 320 of FIG. 3) (not illustrated), a rear plate (e.g., the rear plate 211 of FIG. 2B or the rear plate 380 of FIG. 3) (not illustrated) facing in a direction opposite to that of the front plate, and a lateral member 405 enclosing an internal space between the front plate and the rear plate.

According to an embodiment, the lateral member 405 may constitute a housing (e.g., the housing 210 of FIG. 2A) of the electronic device 400. The lateral member 405 may include the lateral member 218 of FIG. 2A or the lateral member 310 of FIG. 3.

According to an embodiment, the lateral member 405 (e.g., conductive housing) may be at least partially made of a conductive material (e.g., metal). At least a portion of the lateral member 405 may be used as an antenna radiator. The lateral member 405 may be formed by a side bezel structure (e.g., the side bezel structure 2:18 of FIG. 2A or the side bezel structure 310 of FIG. 3) including a metal (e.g., aluminum or aluminum alloy) and/or a polymer. The lateral member 405 may be produced including a conductive material such as aluminum through a die-casting method.

According to an embodiment, the lateral member 405 (e.g., conductive housing) may include a first antenna 410 having a first length, a second antenna 420 extended in a vertical direction from the first antenna 410, and having a second length longer than the first length, a third antenna 430 extended from the second antenna 420 in a direction substantially parallel to the first antenna 410 and having a length substantially the same as the first length, a fourth antenna 440 extended from the third antenna 430 in a direction substantially parallel to the second antenna 420 and having a length substantially the same as the second length, and/or a fifth antenna 450 partially extended in parallel from the first antenna 410 and extended in a vertical direction from the fourth antenna 440 and having a third length. According to various embodiments, a length of the third antenna 430 may be the same as or different from that of the first antenna 410. A length of the fourth antenna 440 may be the same as or different from that of the second antenna 420.

According to various embodiments, the first antenna 410 to the fifth antenna 450 may be used as antenna radiators for transmitting and receiving a wireless signal. The first antenna 410 to the fifth antenna 450 may operate in a first frequency band to a fifth frequency band. For example, the first frequency band to the fifth frequency band may include a frequency band of a sub-6 band (e.g., about 3.3 gigahertz (GHz) to 3.8 GHz) and/or a legacy band (e.g., low band, mid band and/or high band). The first frequency band to the fifth frequency band are not limited to the above-described examples and may transmit and receive signals of other frequency bands.

According to an embodiment, the first antenna 4110 and the second antenna 420 may be separated through a first segment part 415 (e.g., slit). The first segment part 415 may be formed between the first antenna 410 and the second antenna 420. The first segment part 415 may physically separate the first antenna 410 and the second antenna 420 from each other. The first segment part 415 may be filled with a non-conductive member (e.g., the non-conductive member 550 of FIG. 5).

According to various embodiments, the first antenna 410 may include a switching part 412, a power feeding part 414, and/or a ground part 416. The switching part 4112, the power feeding part 414, and/or the ground part 416 may be disposed at an inner surface of the first antenna 4110. The switching part 412 may be disposed adjacent to the first segment part 415. The ground part 416 may be disposed adjacent to the fifth segment part 455. The power feeding part 414 may be disposed between the switching part 412 and the ground put 416. The switching part 412 may convert a frequency band of the first antenna 410. The power feeding part 414 may transmit and receive a wireless signal to and from a wireless communication module (e.g., the wireless communication module 192 of FIG. 1). The ground part 416 may ground the first antenna 410.

According to an embodiment, the second antenna 420 and the third antenna 430 may be separated through a second segment part 425 (e.g., slit). The second segment part 425 may be formed between the second antenna 420 and the third antenna 430. The second segment part 425 may physically separate the second antenna 420 and the third antenna 430 from each other. The second segment part 425 may be filled with a non-conductive member.

According to an embodiment, the third antenna 430 and the fourth antenna 440 may be separated through a third segment part 435 (e.g., slit). The third segment part 435 may be formed between the third antenna 430 and the fourth antenna 440. The third segment part 435 may physically separate the third antenna 430 and the fourth antenna 440 from each other. The third segment part 435 may be filled with a non-conductive member.

According to an embodiment, the fourth antenna 440 and the fifth antenna 450 may be separated through a fourth segment part 445 (e.g., slit). The fourth segment part 445 may be formed between the fourth antenna 440 and the fifth antenna 450. The fourth segment part 445 may physically separate the fourth antenna 440 and the fifth antenna 450 from each other. The fourth segment part 445 may be filled with a non-conductive member.

According to an embodiment, the first antenna 4110 and the fifth antenna 450 may be separated through the fifth segment part 455 (e.g., slit). The fifth segment part 455 may be formed between the first antenna 410 and the fifth antenna 450. The fifth segment part 455 may physically separate the first antenna 410 and the fifth antenna 450 from each other. The fifth segment part 455 may be filled with a non-conductive member.

According to an embodiment, the above-described non-conductive member (e.g., the non-conductive member 550 of FIG. 5) may be positioned in at least a portion of an internal space (e.g., an opening 401) of the electronic device 400. The non-conductive member 550 may prevent foreign substances from entering the electronic device 400 from the outside.

According to various embodiments, a non-conductive member (e.g., the non-conductive member 550 of FIG. 5) filled in the first segment part 415 to the fifth segment part 455 may include a dielectric (e.g., insulator) material including at least one of polycarbonate, polyimide, plastic, polymer, or ceramic.

According to an embodiment, the electronic device 400 may include a printed circuit board 460 (e.g., the printed circuit board 340 of FIG. 3) in an internal space of a housing (e.g., the housing 210 of FIG. 2A). The printed circuit board 460 may include a first printed circuit board 461 (e.g., main board) and a second printed circuit board 463 (e.g., sub-board) spaced apart from the first printed circuit board 461.

According to various embodiments, the printed circuit board 460 (e.g., the first printed circuit board 461 or the second printed circuit board 463) may include at least one wireless communication module (e.g., the wireless communication module 192 of FIG. 1). The first antenna 410 to the fifth antenna 450 may be electrically connected to at least one wireless communication module. The first antenna 410 to the fifth antenna 450 may be electrically connected to the printed circuit board 460. The first printed circuit board 461 and the second printed circuit board 463 may be electrically connected through a connecting member (not illustrated). The connection member may include an RF coaxial cable or a flexible printed circuit board.

According to an embodiment, a battery 465 (e.g., the battery 189 of FIG. 11 or the battery 350 of FIG. 3) may be disposed between the first printed circuit board 461 and the second printed circuit board 463. The battery 465 may be disposed not to overlap the first printed circuit board 461 and/or the second printed circuit board 463. The battery 465 may be disposed to at least partially overlap the first printed circuit board 461 and/or the second printed circuit board 463.

According to an embodiment, one surface (e.g., upper portion or lower portion) of the printed circuit board 460 may be disposed at a conductive plate 470 (e.g., the first support member 311 or bracket of FIG. 3). The conductive plate 470 may be electrically connected to the printed circuit board 460 to perform a ground function. The conductive plate 470 may dissipate a heat generated in a heat source (e.g., the processor 120 and the memory 130 of FIG. 1) of the printed circuit board 460. A display (e.g., the display 201 of FIG. 2A or the display 330 of FIG. 3) may be coupled to a first surface of the conductive plate 470, and the printed circuit board 460 may be coupled to a second surface of the conductive plate 470. The conductive plate 470 may physically support the printed circuit hoard 460 and the display (e.g., the display 610 of FIG. 6).

According to various embodiments, at least a portion of the conductive plate 470 may be disposed adjacent to the first antenna 410 to the fifth antenna 450. At least a portion of the conductive plate 470 may be connected to at least a portion of the first antenna 410 to the fifth antenna 450. The conductive plate 470 may be at least partially made of a conductive material (e.g., metal) and/or a non-metal (e.g., polymer) material. The conductive plate 470 may be made of, for example, a magnesium alloy. The conductive plate 470 may include at least one through hole and/or metal shell. The conductive plate 470 may be formed through a mold.

According to various embodiments, the opening 401 may be formed at least partially between the conductive plate 470 and the lateral member 405 (e.g., conductive housing). The conductive plate 470 may be made of the same material as that of the lateral member 405. The conductive plate 470 may be made of a material different from that of the lateral member 405. The conductive plate 470 may be, for example, coupled to the ground part 416 of the first antenna 410 through ultrasonic welding or welding.

Referring to FIGS. 4 and 5, at least a portion of the conductive plate 470 may be disposed adjacent to the first antenna 410 in the vicinity of the first segment part 415 (e.g., a portion A of FIG. 4). The first antenna 410 may be formed through the first segment part 415, the fifth segment part 455, and the opening 401. The non-conductive member 550 may be filled in at least a portion of the first segment part 415, the fifth segment part 455, and the opening 401.

According to an embodiment, an end surface 510 of the first antenna 410 and an end surface 570 of the conductive plate 470 may be disposed at a predetermined distance. Facing surfaces of the end surface 510 of the first antenna 410 and the end surface 570 of at least a portion of the conductive plate 470 may be formed in an asymmetric shape. A distance between facing surfaces of the end surface 510 of the first antenna 410 and the end surface 570 of the conductive plate 470 may be formed to be non-constant. Each of the end surface 510 of the first antenna 410 and the end surface 570 of the conductive plate 470 may be formed in, for example, a stepped shape and/or a concave-convex shape such that a facing area is minimized. The non-conductive member 550 (e.g., polycarbonate) may be filled in a separation space (e.g., the opening 401) between the end surface 510 of the first antenna 410 and the end surface 570 of the conductive plate 470.

According to various embodiments, at least a portion of the end surface 510 of the first antenna 410 may be cut. The end surface 510 of the first antenna 410 may include at least one step portion 515 (e.g., stepped portion). At least a portion of the end surface 570 of the conductive plate 470 may be cut. The end surface 570 of the conductive plate 470 may include at least one step portion 575 (e.g., stepped portion).

According to various embodiments, as at least one step portion 515 (e.g., stepped portion) is formed at the end surface 510 of the first antenna 410, and at least one step portion 575 (e.g., stepped portion) is formed at the end surface 570 of the conductive plate 470, a facing area of the end surface 510 of the first antenna 410 and the end surface 570 of the conductive plate 470 may be reduced. In this case, an appropriate distance may be maintained between the first antenna 410 and the conductive plate 470, and a radiation loss of the first antenna 410 may be reduced.

According to various embodiments, as the non-conductive member 550 is filled in at least one step portion 515 formed at the end surface 510 of the first antenna 410 and at least one step portion 575 formed at the end surface 570 of the conductive plate 470, mechanical strength may be increased due to an external impact.

Figure 6:
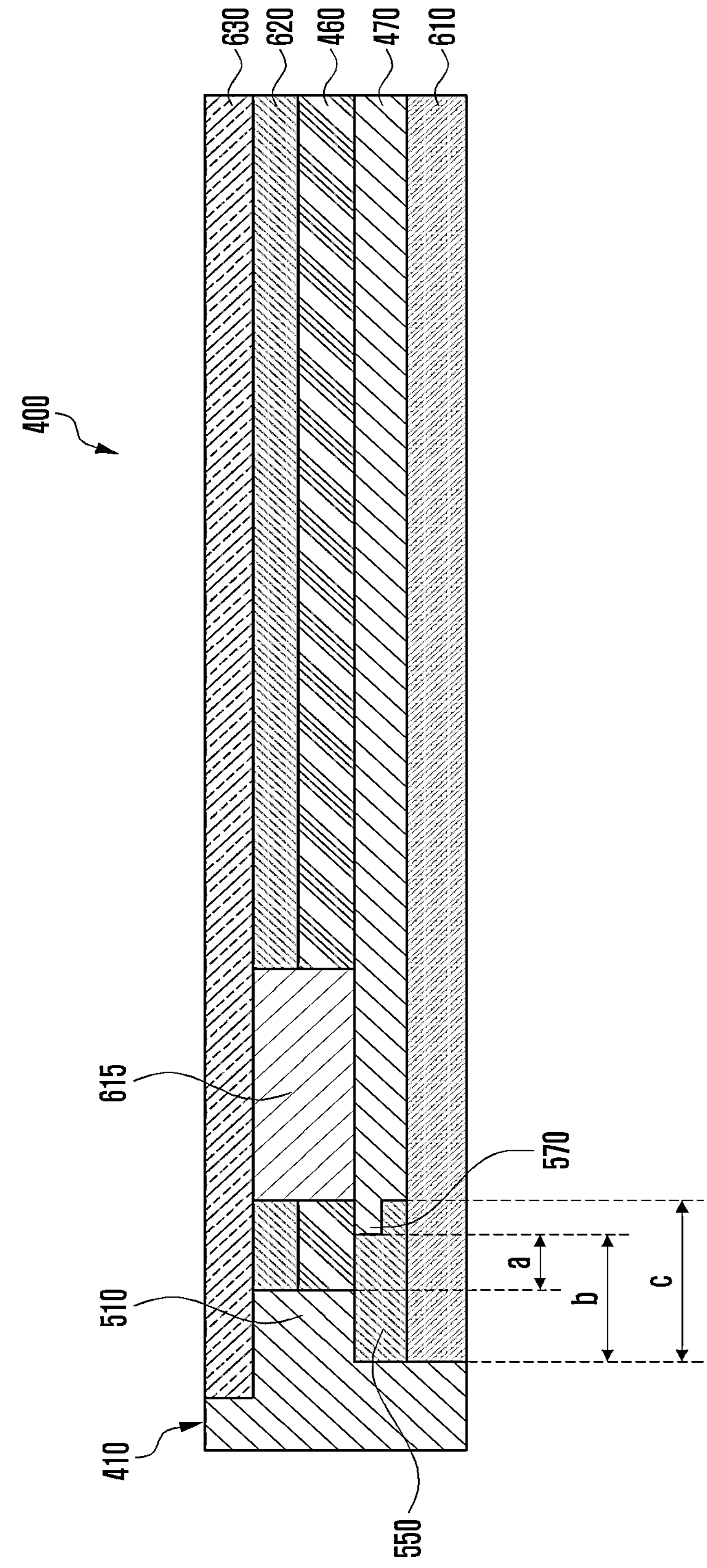
FIG. 6 is a cross-sectional view schematically illustrating a partial constitution of the electronic device illustrated in FIG. 4 according to an embodiment of the disclosure.

FIG. 6 is a cross-sectional view schematically illustrating a partial constitution of the electronic device illustrated in FIG. 4 according to an embodiment of the disclosure.

In the description of FIG. 6, the same reference numerals may be assigned to the same components as those of the embodiments of the electronic device 400 illustrated in FIGS. 4 and 5, and duplicate descriptions of functions thereof may be omitted.

Referring to FIG. 6, an electronic device 400 according to various embodiments of the disclosure may include a first antenna 410, a conductive plate 470, a display 610, a printed circuit board 460, a reinforcing member 620, a camera 615, and/or a rear plate 630.

According to an embodiment, the first antenna 410 (hereinafter, referred to as an antenna 410) may have an end surface 510 adjacent to a first segment part 415 (hereinafter, referred to as a segment part 415). At least a portion of the end surface 510 of the antenna 410 may be cut to form a step portion (e.g., a step portion 515 of FIG. 5). The end surface 510 of the antenna 410 may include at least one convex surface and/or concave surface.

According to an embodiment, at a facing surface of the end surface 510 of the antenna 410, at least a portion of the end surface 570 of the conductive plate 470 may be disposed at a predetermined distance. At least a portion of the end surface 570 of the conductive plate 470 may be cut to form a step portion (e.g., a step portion 575 of FIG. 5). The end surface 570 of the conductive plate 470 may include at least one convex surface and/or concave surface. Facing surfaces of the end surface 5:10 of the antenna 410 and the end surface 570 of at least a portion of the conductive plate 470 may be formed in an asymmetric shape. A distance between facing surfaces of the end surface 510 of the antenna 410 and the end surface 570 of the conductive plate 470 may be formed to be non-constant. A separation space (e.g., the opening 401) between the end surface 510 of the antenna 4:10 and the end surface 570 of the conductive plate 470 may be filled with a non-conductive member 550 (e.g., polycarbonate).

According to various embodiments, the most adjacent part (e.g., part a) between the end surface 510 of the antenna 410 and the end surface 570 of the conductive plate 470 may be, for example, disposed with a gap of about 0.9 mm to 1.9 mm. A part (e.g., part b) between a concave surface formed in at least a portion of the end surface 510 of the antenna 410 and a convex surface formed in at least a portion of the end surface 570 of the conductive plate 470 may be, for example, disposed with a gap of about 1.7 mm to 2.7 mm. A part (e.g., part c) between a concave surface formed in at least a portion of the end surface 510 of the antenna 410 and a concave surface formed in at least a portion of the end surface 570 of the conductive plate 470 may be, for example, disposed with a gap of about 2.1 mm to 3.1 atm.

According to an embodiment, the display 610 may be disposed in at least a portion of the first surface of the conductive plate 470. The display 610 may be coupled to the first surface of the conductive plate 470. The display 610 may be coupled to the conductive plate 470 and the non-conductive member 550.

According to various embodiments, the display 610 may include at least one of the display module 160 of FIG. 1, the display 201 of FIG. 2A, or the display 330 of FIG. 3. The display 610 may display information input by the user or information to be provided to the user in the electronic device 400. The display 610 may perform an input function and a display function.

According to an embodiment, the printed circuit board 460 may be disposed in at least a portion of the second surface of the conductive plate 470. A first surface of the printed circuit board 460 may be coupled to the second surface of the conductive plate 470. The printed circuit board 460 may be at least partially electrically connected to the conductive plate 470, and the conductive plate 470 may perform a ground (GND) function of the antenna 410. The printed circuit board 460 may include at least one hole. A camera 615 (e.g., the camera module 180 of FIG. 1) may be mounted through at least one hole formed in the printed circuit hoard 460.

According to an embodiment, a first surface of the reinforcing member 620 may be disposed at a second surface of the printed circuit board 460. The reinforcing member 620 may be made of substantially the same material (e.g., dielectric) as that of the non-conductive member 550. At least a portion of the reinforcing member 620 may be coupled to at least a portion of the end surface 510 of the antenna 410. The reinforcing member 620 may increase a supporting force between the end surface 510 of the antenna 410 and the conductive plate 470. The reinforcing member 620 may be filled in at least a portion of an internal space (e.g., the opening 401) of the electronic device 400.

According to an embodiment, the rear plate 630 may be disposed at the first surface of the reinforcing member 620. At least a portion of the rear plate 630 may be coupled on at least a portion of the end surface 510 of the antenna 410. The rear plate 630 may be coupled to the rear surface of the electronic device 400. The rear plate 630 may be made of a material such as tempered glass, plastic, or aluminum oxide.

Figure 7:
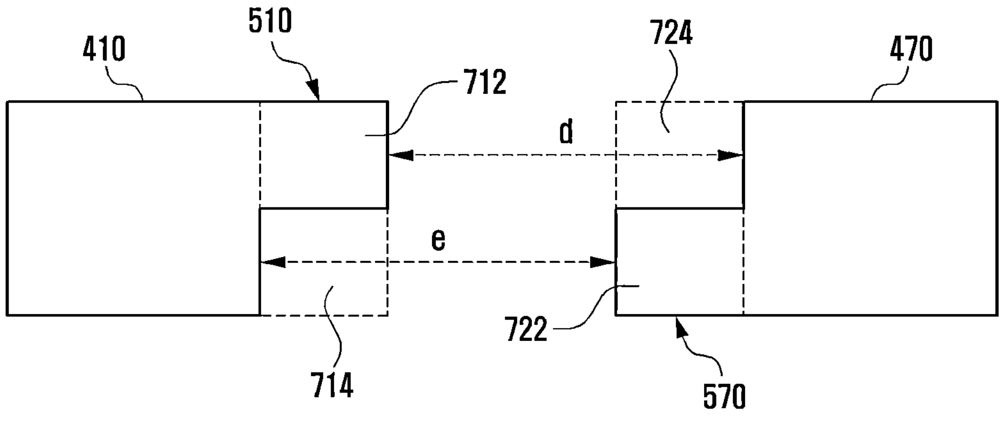
FIG. 7 is a cross-sectional view schematically illustrating a constitution of an embodiment of an end surface of an antenna and an end surface of a conductive plate of an electronic device according to an embodiment of the disclosure.

FIG. 7 is a cross-sectional view schematically illustrating a constitution of an embodiment of an end surface of an antenna and an end surface of a conductive plate of an electronic device according to an embodiment of the disclosure.

Hereinafter, in the description of the drawings, the same reference numerals may be assigned to the same components as those of the embodiment of the electronic device 400 illustrated in FIGS. 4 to 6 described above, and duplicate descriptions of functions thereof may be omitted.

Referring to FIG. 7, the end surface 510 of the first antenna 410 (hereinafter, referred to as the antenna 410) and the end surface 570 of the conductive plate 470 according to various embodiments of the disclosure may be disposed at a predetermined gap. Facing surfaces of the end surface 510 of the antenna 410 and the end surface 570 of the conductive plate 470 may be formed in an asymmetric shape. A distance between facing surfaces of the end surface 510 of the antenna 410 and the end surface 570 of the conductive plate 470 may be formed to be non-constant. The non-conductive member 550 may be filled between the end surface 510 of the antenna 410 and the end surface 570 of the conductive plate 470.

According to an embodiment, a convex portion 712 may be formed in the antenna 410 by a cutting area 714 in which at least a portion of the end surface 510 is cut. The cutting area 714 may be formed by cutting a lower portion of the end surface 510 of the antenna 410. The convex portion 712 may be formed in an upper portion of the end surface 510 of the antenna 410. The cutting area 714 of the end surface 510 of the antenna 410 may be cut in a rectangular shape. The convex portion 712 of the end surface 510 of the antenna 410 may have a rectangular shape.

According to an embodiment, a convex portion 722 may be formed in the conductive plate 470 by a cutting area 724 in which at least a portion of the end surface 570 is cut. The cutting area 724 may be formed by cutting an upper portion of the end surface 570 of the conductive plate 470. The convex portion 722 may be formed in a lower portion of the end surface 570 of the conductive plate 470. The cutting area 724 of the end surface 570 of the conductive plate 470 may be cut in a rectangular shape. The convex portion 722 of the end surface 570 of the conductive plate 470 may have a rectangular shape.

According to an embodiment, the convex portion 712 formed at the end surface 510 of the antenna 410 may face the cutting area 724 cut from the end surface 570 of the conductive plate 470. The cutting area 714 cut from the end surface 510 of the antenna 410 may face the convex portion 722 formed at the end surface 570 of the conductive plate 470.

According to various embodiments, a gap (e.g., a point d of FIG. 7) between an end surface of the convex portion 712 formed at the end surface 510 of the antenna 410 and an end surface of the cutting area 724 cut from the end surface 570 of the conductive plate 470 may be substantially the same as a gap (e.g., a point e of FIG. 7) between an end surface of the cutting area 714 cut from the end surface 510 of the antenna 410 and an end surface of a convex portion 722 formed at the end surface 570 of the conductive plate 470.

According to various embodiments, while a predetermined gap between the antenna 410 and the conductive plate 470 is maintained, an area in which the end surfaces 510 and 570 face each other may be reduced.

Figure 8:
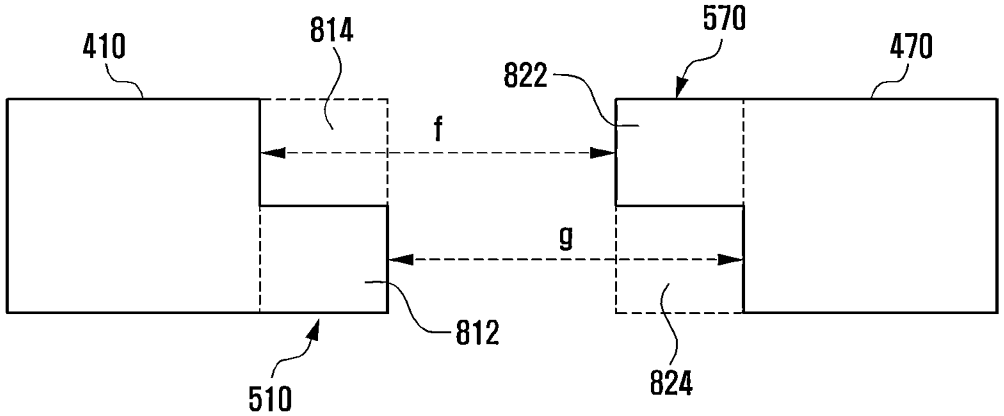
FIG. 8 is a cross-sectional view schematically illustrating a constitution of another embodiment of an end surface of an antenna and an end surface of a conductive plate of an electronic device according to an embodiment of the disclosure.

FIG. 8 is a cross-sectional view schematically illustrating a constitution of another embodiment of an end surface of an antenna and an end surface of a conductive plate of an electronic device according to an embodiment of the disclosure.

According to an embodiment, a convex portion 812 may be formed in the antenna 410 by a cutting area 814 in which at least a portion of the end surface 510 is cut. The cutting area 814 may be formed by cutting an upper portion of the end surface 510 of the antenna 410. The convex portion 812 may be formed in a lower portion of the end surface 510 of the antenna 410.

According to an embodiment, a convex portion 822 may be formed in the conductive plate 470 by a cutting area 824 in which at least a portion of the end surface 570 is cut. The cutting area 824 may be formed by cutting a lower portion of the end surface 570 of the conductive plate 470. The convex portion 822 may be formed in an upper portion of the end surface 570 of the conductive plate 470.

According to an embodiment, the cutting area 814 formed at the end surface 510 of the antenna 410 may face the convex portion 822 formed at the end surface 570 of the conductive plate 470. The convex portion 812 formed at the end surface 510 of the antenna 410 may face the cutting area 824 cut from the end surface 570 of the conductive plate 470.

According to various embodiments, a gap (e.g., a point f of FIG. 8) between an end surface of the cutting area 814 cut from the end surface 510 of the antenna 410 and an end surface of the convex portion 822 formed at the end surface 570 of the conductive plate 470 may be substantially the same as a gap (e.g., a point g of FIG. 8) between an end surface of the convex portion 812 formed at the end surface 510 of the antenna 410 and an end surface of the cutting area 824 cut from the end surface 570 of the conductive plate 470.

Figure 9:
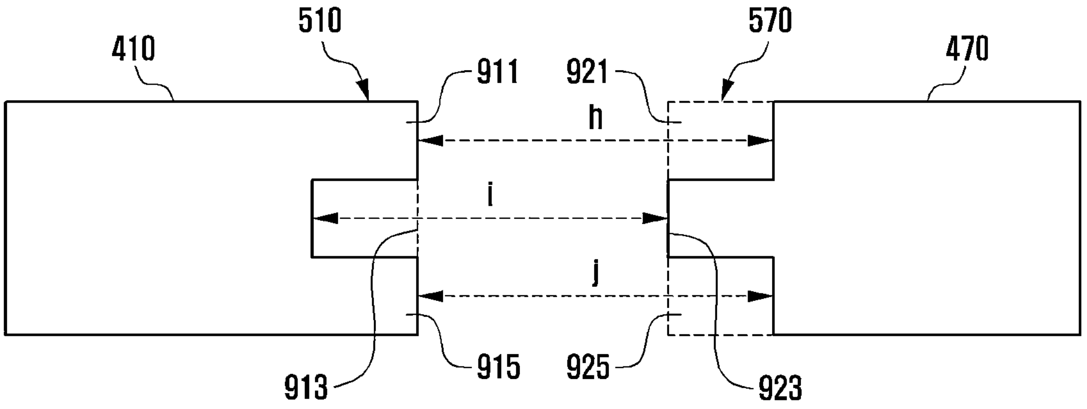
FIG. 9 is a cross-sectional view schematically illustrating a constitution of another embodiment of an end surface of an antenna and an end surface of a conductive plate of an electronic device according to an embodiment of the disclosure.

FIG. 9 is a cross-sectional view schematically illustrating a constitution of another embodiment of an end surface of an antenna and an end surface of a conductive plate of an electronic device according to an embodiment of the disclosure.

According to an embodiment, a first convex portion 911 and a second convex portion 915 may be formed in the antenna 410 by a cutting area 913 in which at least a portion of the end surface 510 is cut. The cutting area 913 may be formed by cutting a middle portion of the end surface 510 of the antenna 410. The first convex portion 911 may be formed in an upper portion of the end surface 510 of the antenna 410. The second convex portion 915 may be formed in a lower portion of the end surface 510 of the antenna 410.

According to an embodiment, a convex portion 923 may be formed in the conductive plate 470 by a first cutting area 921 and a second cutting area 925 in which at least a portion of the end surface 570 is cut. The first cutting area 921 may be formed by cutting an upper portion of the end surface 570 of the conductive plate 470. The second cutting area 925 may be formed by cutting a lower portion of the end surface 570 of the conductive plate 470. The convex portion 923 may be formed in a middle portion of the end surface 570 of the conductive plate 470.

According to an embodiment, the first convex portion 911 formed at the end surface 510 of the antenna 410 may face the first cutting area 921 cut from the end surface 570 of the conductive plate 470. The cutting area 913 cut from the end surface 510 of the antenna 410 may face the convex portion 923 formed at the end surface 570 of the conductive plate 470. The second convex portion 915 formed at the end surface 510 of the antenna 410 may face the second cutting area 925 cut from the end surface 570 of the conductive plate 470.

According to various embodiments, a gap (e.g., a point h of FIG. 9) between an end surface of the first convex portion 911 formed at the end surface 510 of the antenna 410 and an end surface of the first cutting area 921 cut from the end surface 570 of the conductive plate 470 may be substantially the same as a gap (e.g., a point i of FIG. 9) between an end surface of the cutting area 913 cut from the end surface 510 of the antenna 4110 and an end surface of the convex portion 923 formed at the end surface 570 of the conductive plate 470. A gap (e.g., the point h of FIG. 9) between an end surface of the first convex portion 911 formed at the end surface 510 of the antenna 410 and an end surface of the first cutting area 921 cut from the end surface 570 of the conductive plate 470 may be substantially the same as a gap (e.g., a point j of FIG. 9) between an end surface of the second convex portion 915 formed at the end surface 510 of the antenna 410 and an end surface of the second cutting area 925 cut from the end surface 570 of the conductive plate 470.

According to various embodiments, a constitution of the end surface 510 of the antenna 4110 may be changed to that of the end surface 570 of the conductive plate 470. For example, the first convex portion 911, the cutting area 913, and the second convex portion 915 formed at the end surface 510 of the antenna 410 may be formed at the end surface 570 of the conductive plate 470. The first cutting area 921, the convex portion 923, and the second cutting area 925 formed at the end surface 570 of the conductive plate 470 may be formed at the end surface 510 of the antenna 410.

Figure 10:
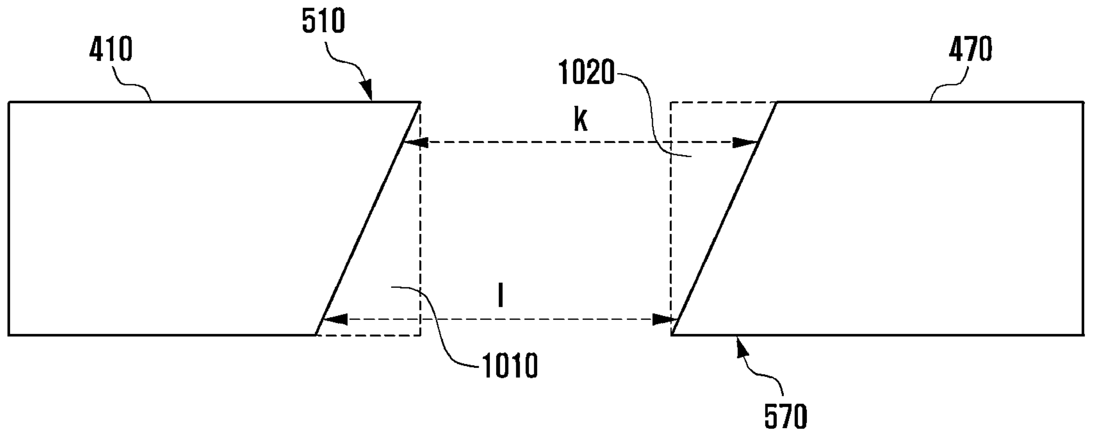
FIG. 10 is a cross-sectional view schematically illustrating a constitution of another embodiment of an end surface of an antenna and an end surface of a conductive plate of an electronic device according to an embodiment of the disclosure.

FIG. 10 is a cross-sectional view schematically illustrating a constitution of another embodiment of an end surface of an antenna and an end surface of a conductive plate of an electronic device according to an embodiment of the disclosure.

According to an embodiment, the antenna 410 may include a cutting area 1010 in which at least a portion of the end surface 510 is cut in a triangular shape. The end surface 510 of the antenna 410 may include an inclined surface inclined from the top to the bottom.

According to an embodiment, the conductive plate 470 may include a cutting area 1020 in which at least a portion of the end surface 570 is cut in a triangular shape. The end surface 570 of the conductive plate 470 may include an inclined surface inclined from the top to the bottom.

According to an embodiment, the inclined surface formed at the end surface 510 of the antenna 410 may face the inclined surface formed at the end surface 570 of the conductive plate 470.

According to various embodiments, a gap (e.g., a point k of FIG. 10) between an upper point of the inclined surface formed at the end surface 5110 of the antenna 410 and an upper point of the inclined surface formed at the end surface 570 of the conductive plate 470 may be substantially the same as a gap (e.g., a point l of FIG. 10) between a lower point of the inclined surface formed at the end surface 510 of the antenna 410 and a lower point of the inclined surface formed at the end surface 570 of the conductive plate 470.

According to various eMbodiments, the end surface 510 of the antenna 410 and the end surface 570 of the conductive plate 470 are not limited to the above-described FIGS. 7 to 10, and may be modified in various forms.

Figure 11A:
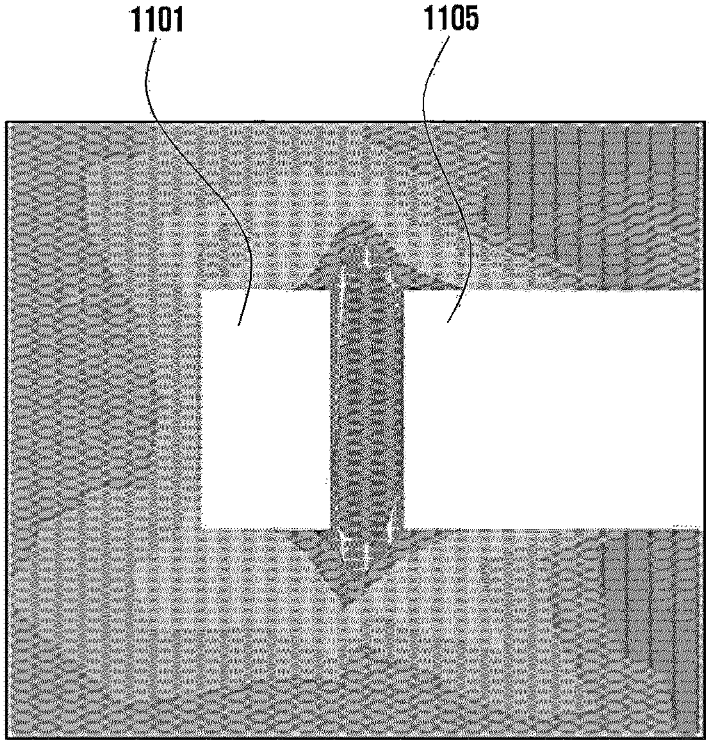
FIGS. 11A and 11B are diagrams illustrating an electric field distribution of an electronic device according to a comparative embodiment and an electric field distribution of an electronic device according to various embodiments of the disclosure.
Figure 11B:
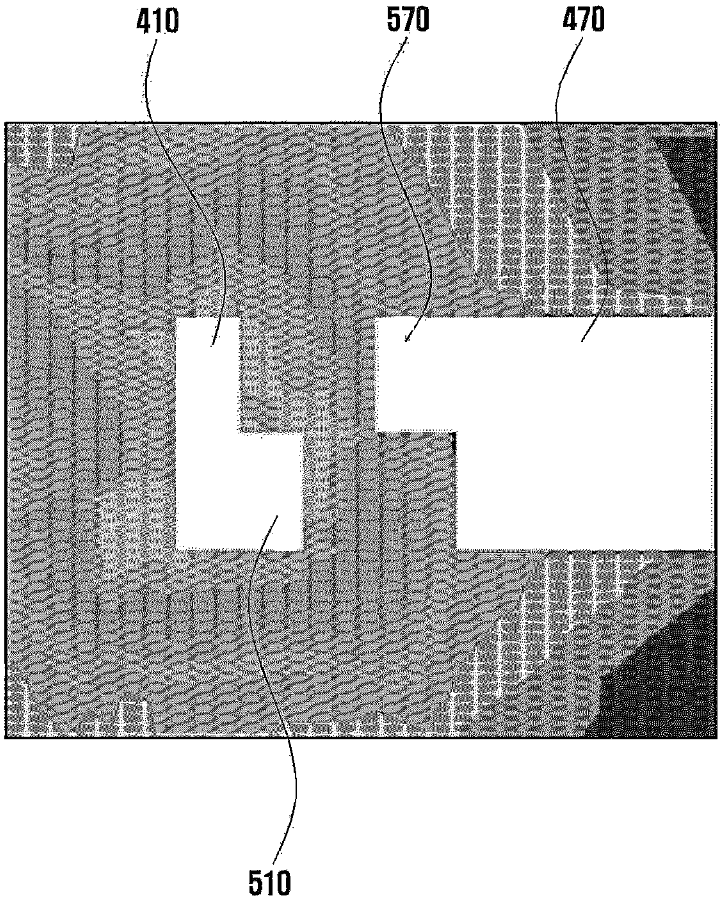

FIGS. 11A and 11B are diagrams illustrating an electric field distribution of an electronic device according to a comparative embodiment and an electric field distribution of an electronic device according to various embodiments of the disclosure.

FIG. 11A illustrates an electric field distribution of an electronic device according to a comparative embodiment having a shape in which facing surfaces of an end surface of an antenna 1101 and an end surface of a conductive plate 1105 are symmetrical.

Referring to FIG. 11A, in an electronic device according to the comparative embodiment, in the case that facing surfaces of the end surface of the antenna 1101 and the end surface of the conductive plate 1105 are symmetrical, it may be identified that a strong electric field is formed between the antenna 1101 and the conductive plate 1105. In the electronic device according to the comparative embodiment, a radiation loss between the antenna 1101 and the conductive plate 1105 may increase due to the strong electric field.

FIG. 11B illustrates an electric field distribution of an electronic device 400 according to various embodiments of the disclosure having a shape in which facing surfaces of the end surface 510 of the antenna 410 and the end surface 570 of the conductive plate 470 are asymmetric.

Referring to FIG. 11B, in the electronic device 400 according to various embodiments of the disclosure, in the case that a distance between facing surfaces of the end surface 510 of the antenna 410 and the end surface 570 of the conductive plate 470 is formed to be not constant, it may be identified that an electric field between the antenna 410 and the conductive plate 470 is formed weaker than that of the electronic device according to the comparative embodiment. The electronic device 400 according to various embodiments of the disclosure may reduce a radiation loss between the antenna 410 and the conductive plate 470.

Figure 12:
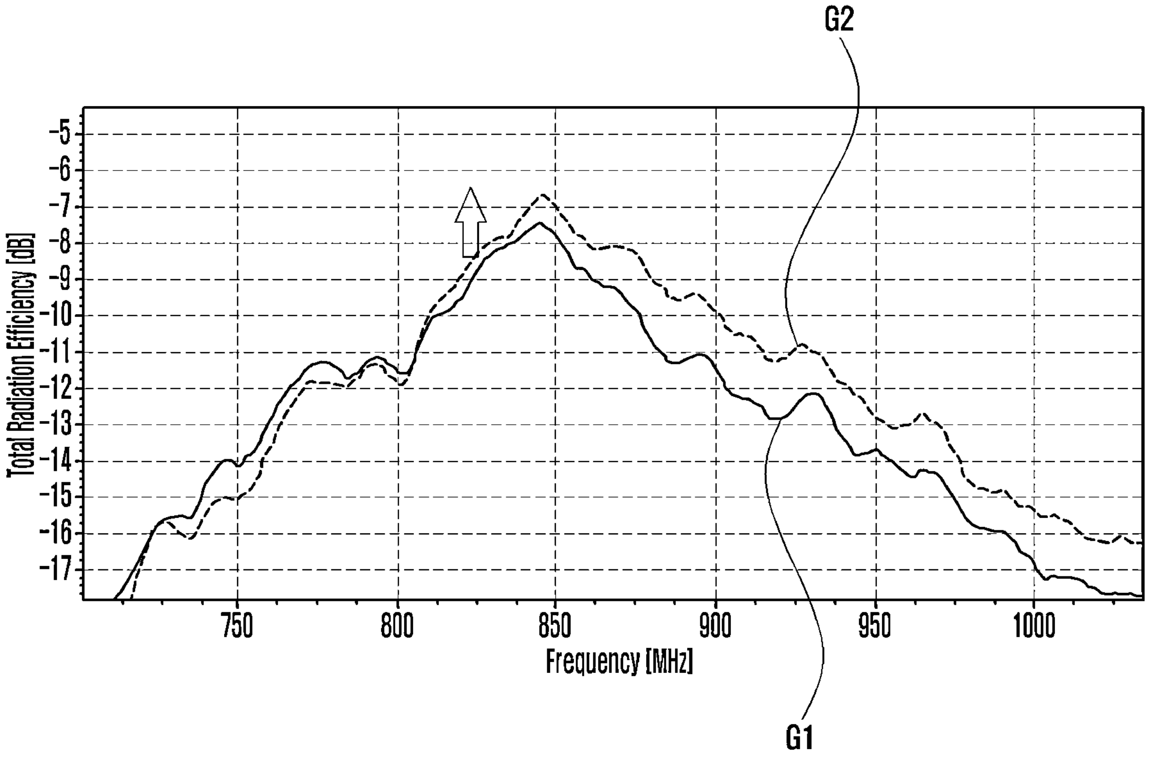
FIG. 12 is a graph comparing radiation efficiency of an electronic device according to a comparative embodiment and radiation efficiency of an electronic device according to an embodiment of the disclosure.

FIG. 12 is a graph comparing radiation efficiency of an electronic device according to a comparative embodiment and radiation efficiency of an electronic device according to an embodiment of the disclosure.

According to various embodiments, the electronic device according to the comparative embodiment may have a shape in which facing surfaces of the end surface of the antenna 11101 and the end surface of the conductive plate 1105 are symmetrical. However, in the electronic device 400 according to various embodiments of the disclosure, a distance between facing surfaces of the end surface 510 of the antenna 410 and the end surface 570 of the conductive plate 470 may be formed to be not constant.

Referring to FIG. 12, compared to radiation efficiency G1 of the electronic device according to the comparative embodiment, it may be identified that radiation efficiency G2 of the electronic device 400 according to various embodiments of the disclosure is improved from a frequency band of, for example, about 700 megahertz (MHz) or more to about 1 dB or more.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:

a conductive housing;

a printed circuit board disposed in an inner space of the conductive housing and comprising a wireless communication module;

a conductive plate in which the printed circuit board is disposed;

a segment part configured to separate at least a portion of the conductive housing;

an opening disposed between the conductive housing and the conductive plate;

an antenna formed through the segment part and the opening; and a non-conductive member configured to fill at least a portion of the segment part and the opening, wherein a distance between facing surfaces of an end surface of the antenna and an end surface of the conductive plate is configured to vary.

2. The electronic device of claim 1, wherein a non-conductive member is configured to be filled between the antenna and the conductive plate.

3. The electronic device of claim 1, wherein at least one of a switching part, a power feeding part, or a ground part is disposed at an inner surface of the antenna, and wherein the ground part of the antenna is configured to couple to at least a portion of the conductive plate.

4. The electronic device of claim 1, wherein at least a portion of the conductive plate is configured to be electrically connected to the printed circuit board and to perform a ground function.

5. The electronic device of claim 1, wherein the end surface of the antenna comprises a step shape, and wherein the end surface of the conductive plate comprises a cutting area in which at least a portion thereof is cut.

6. The electronic device of claim 5, wherein the cut portion of the end surface of the conductive plate corresponds to the step shape of the end surface of the antenna.

7. The electronic device of claim 1, wherein the end surface of the antenna comprises a cutting area in which at least a portion thereof is cut, and wherein the end surface of the conductive plate comprises a step shape.

8. The electronic device of claim 7, wherein the cut portion of the end surface of the antenna corresponds to the step shape of the end surface of the conductive plate.

9. The electronic device of claim 1, wherein the end surface of the antenna comprises at least one convex portion, and the end surface of the conductive plate comprises a cutting area in which at least a portion thereof is cut.

10. The electronic device of claim 1, wherein the end surface of the antenna comprises an inclined surface inclined from an upper portion thereof to a lower portion thereof, and wherein the end surface of the conductive plate comprises an inclined surface inclined from an upper portion thereof to a lower portion thereof.

11. The electronic device of claim 1, wherein a closest part between the end surface of the antenna and the end surface of the conductive plate is configured to have a gap of approximately 0.9 mm to 1.9 mm, wherein a part between a concave surface formed in at least a portion of the end surface of the antenna and a convex surface formed in at least a portion of the end surface of the conductive plate is configured to have a gap of approximately 1.7 mm to 2.7 mm, and wherein a part between the concave surface of the end surface of the antenna and a concave surface formed in at least a portion of the end surface of the conductive plate is configured to have a gap of approximately 2.1 mm to 3.1 mm.

12. The electronic device of claim 1, wherein a gap between an end surface of a convex portion of the end surface of the antenna and an end surface of a cutting area cut from the end surface of the conductive plate is substantially the same as a gap between an end surface of a cutting area cut from the end surface of the antenna and an end surface of a convex portion at the end surface of the conductive plate.

13. The electronic device of claim 1, wherein a gap between an end surface of a cutting area cut from the end surface of the antenna and an end surface of a convex portion of the end surface of the conductive plate is substantially the same as a gap between an end surface of a convex portion of the end surface of the antenna and an end surface of a cutting area cut from the end surface of the conductive plate.

14. An electronic device comprising:

a conductive housing;

a segment part configured to separate at least a portion of the conductive housing;

an opening formed between the conductive housing and a conductive plate;

an antenna formed through the segment part and the opening;

a non-conductive member configured to fill at least a portion of the segment part and the opening;

a display disposed at a first surface of the conductive plate;

a printed circuit board disposed at a second surface of the conductive plate and comprising a wireless communication module; and a rear plate configured to cover a rear surface of the printed circuit board, wherein a distance between facing surfaces of an end surface of the antenna and an end surface of the conductive plate is configured to vary.

15. The electronic device of claim 14, wherein a reinforcing member is included between the printed circuit board and the rear plate, the reinforcing member being non-conductive, and wherein at least a portion of the reinforcing member is configured to couple to at least a portion of the end surface of the antenna.

16. The electronic device of claim 14, wherein the non-conductive member fills between the antenna and the conductive plate.

17. The electronic device of claim 14, wherein at least one of a switching part, a power feeding part, or a ground part is disposed at an inner surface of the antenna, and wherein the ground part of the antenna is configured to couple to at least a portion of the conductive plate.

18. The electronic device of claim 14, wherein at least a portion of the conductive plate is configured to be electrically connected to the printed circuit board and to perform a ground function.

19. The electronic device of claim 14, wherein the end surface of the antenna comprises a step shape, and wherein the end surface of the conductive plate comprises a cutting area in which at least a portion thereof is cut.

20. The electronic device of claim 14, wherein the end surface of the antenna comprises a cutting area in which at least a portion thereof is cut, and wherein the end surface of the conductive plate comprises a step shape.

* * * * *